(12) United States Patent
Kohara

(10) Patent No.: US 6,600,575 B1
(45) Date of Patent: Jul. 29, 2003

(54) CLOCK SUPPLY CIRCUIT

(75) Inventor: Ryuichi Kohara, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 09/340,814

(22) Filed: Jun. 28, 1999

(30) Foreign Application Priority Data

Jul. 22, 1998 (JP) .......................................... 10-206066

(51) Int. Cl.[7] .............................................. H04N 1/00
(52) U.S. Cl. ...................... 358/406; 358/409; 358/410; 347/11; 347/57; 327/295; 327/115; 327/117
(58) Field of Search ................. 358/406, 409, 358/410, 411, 412; 347/11, 57, 249, 247, 250, 237; 327/295, 115, 117, 293, 296, 144, 145

(56) References Cited

U.S. PATENT DOCUMENTS

| | | | | |
|---|---|---|---|---|
| 5,150,068 A | * | 9/1992 | Kawashima et al. | 327/145 |
| 5,184,027 A | * | 2/1993 | Masuda et al. | 327/149 |
| 5,285,221 A | * | 2/1994 | Sumiyoshi et al. | 347/119 |
| 5,483,204 A | * | 1/1996 | Tanoi | 327/155 |
| 5,602,578 A | * | 2/1997 | Sumiyoshi et al. | 347/232 |
| 5,712,714 A | * | 1/1998 | Sasahara | 358/1.16 |
| 5,926,174 A | * | 7/1999 | Shibamiya et al. | 345/213 |
| 6,072,846 A | * | 6/2000 | Kyung et al. | 327/149 |
| 6,079,022 A | * | 6/2000 | Young | 713/300 |
| 6,211,715 B1 | * | 4/2001 | Terauchi | 327/115 |
| 6,278,303 B1 | * | 8/2001 | Nakanishi et al. | 327/142 |
| 6,285,723 B1 | * | 9/2001 | Yamada et al. | 327/229 |

FOREIGN PATENT DOCUMENTS

EP 810802 * 12/1997 ............ H04Q/7/00

* cited by examiner

Primary Examiner—Edward Coles
Assistant Examiner—Tia Carter
(74) Attorney, Agent, or Firm—Akin Gump Strauss Hauer & Feld, L.L.P.

(57) ABSTRACT

A clock dividing section receives a system clock and generates and outputs clock signals of two or more types. Selectors select any of the clock signals of two or more types outputted by the clock dividing section and feed it to a printing control block or reading control block. A decision divider monitors operational states of each block and gives control so that a frequency to be supplied to a functional block in an idle state where any operation is not required is lower than that to be supplied to a functional block being in an active state. Power consumption of the whole custom IC can be more reduced compared with a configuration wherein a clock of fixed frequency is constantly supplied to each functional block and a noise can be controlled.

24 Claims, 11 Drawing Sheets

CLOCK SUPPLY CIRCUIT

BACKGROUND OF THE INVENTION

The present invention relates to a clock supply circuit built suitably into a custom IC such as a gate array, a cell based IC and the like.

A custom IC such as a gate array, a cell based IC and the like has been used, to meet required specifications at a low cost, for part of electric circuits in electronic apparatuses including a facsimile, printer, etc. Functions provided by custom ICs are various and their logical configurations are generally composed of a combinational circuit and a sequential circuit. In the combinational circuit, a value of an output signal is decided by only a value of an input signal and a timing of its output does not receive control. On the other hand, in the sequential circuit, a timing of its output is controlled by a clock signal externally inputted.

However, there have been following problems to be solved in the conventional technologies.

In general, a custom IC constituting an electric circuit in an electronic apparatus and being mounted on the electronic apparatus has been designed so that a plurality of functions is incorporated into one IC. Accordingly, in some cases, clocks each having a different frequency are used for a sequential circuit provided to each functional block. In these cases, a clock supply circuit receives a system clock fed by a clock generating circuit of the electronic apparatus and this clock supply circuit divides the system clock so that the divided clock has a frequency required for operations of each sequential circuit and supplies it to each functional block.

However, the custom ICs have been made large-scale and a block having a high operational clock frequency has been employed, causing increased power consumption of the whole custom ICs. Moreover, when the custom IC operates at a high frequency, increased noise components are emitted, presenting a problem that a rigorous and overall countermeasure against such a noise must be taken in a printed circuit board of the electronic apparatus or other devices incorporating the custom IC therein.

SUMMARY OF THE INVENTION

In view of the above, it is an object of the present invention to provide a clock supply circuit which allows reduction of power consumption in operations of a functional block using a clock signal having a high frequency and which allows solutions to a noise problem induced by a functional block using a clock signal having a high frequency.

According to an aspect of the present invention, there is provided a clock supply circuit for feeding a clock signal to a functional block of an electronic apparatus having a functional block operating based on a clock signal produced by dividing a system clock comprising:

a clock dividing section for generating the clock signal to be fed to the functional block by dividing the system clock; and a control section for controlling a supply of the clock signal from the clock dividing section to the functional block depending on an active state of said functional block where a desired operation is required or on an idle state where no operation is required.

In the foregoing, a preferable mode is one wherein the clock dividing section is adapted to generate a plurality of clock signals each having a different frequency and wherein the control section comprises selectors adapted to selectively output the plural clock signals fed by the clock dividing section, and a decision section adapted to control a selection operation of the selectors so that, in an active state of the functional block where the desired operation is required, a clock signal selected out of the plural clock signals having proper frequency is supplied to ensure adequate operations of the functional block and so that, in an idle state, a clock signal having a frequency being lower than that of the clock supplied in the state where the desired operation is required is fed to the functional block.

Also, a preferable mode is one wherein the electronic apparatus is equipped with a plurality of functional blocks and wherein the clock dividing section is adapted to generate a plurality of clock signals each having a different frequency depending on each functional block and wherein each block is provided with each selector.

Also, a preferable mode is one wherein the control section is provided with a counter used for detecting the termination of the desired operation of each functional block and the frequency of a clock signal to be fed to each functional block the termination of the desired operation of which is detected by the counter is made lower by the decision section.

Also, a preferable mode is one wherein the control section is further provided with a gate circuit adapted to allow or not to allow a supply of the clock signal to the functional block and the operation of the gate circuit is so controlled by the decision section that, in an operational state of the functional block where the desired operation is required, the clock signal is supplied to the functional block to ensure proper operations of the functional block and that, in an idle state, the supply of the clock signal to the functional block is stopped.

Also, a preferable mode is one wherein the control section comprises a gate circuit adapted to allow or not to allow the supply of the clock signal outputted from the clock dividing section to the functional block and a decision circuit adapted to give control to operations of the gate circuit so that, in an active state of the functional block where the desired operation is required, the clock signal is supplied to the functional block to ensure proper operations of the functional block and that, in an idle state, the supply of said clock signal to said functional block is stopped.

Also, a preferable mode is one wherein the electronic apparatus is provided with a first functional block to control reading of data and a second functional block to control printing operations, having a facsimile function and copying function and wherein the dividing section is adapted to generate a clock signal having three kinds of frequencies, i.e., lowest frequency, highest frequency and intermediate frequency to be fed to the first and second functional blocks and the clock signal to be fed to the functional block according to the active state and idle state of the each functional block is selected out of the clock signal having the lowest, highest and intermediate frequencies with reference to each of operational modes including copying, sending and receiving operation modes of said electronic apparatus.

Also, a preferable mode is one wherein the electronic apparatus, in the copying operation mode, is adapted to supply a clock signal having the lowest frequency to the first functional block while it is in an idle state and to supply a clock signal having the highest frequency to the first functional block while it is in an active state, or to supply a clock signal having the lowest frequency to the second functional block while it is in an idle state and to supply a clock, signal having the highest frequency to the functional block while it is in an active state.

Also, a preferable mode is one wherein the electronic apparatus, in the sending operation mode, is adapted to supply a clock signal having the lowest frequency to the first functional block while it is in an idle state and to supply a clock signal having the intermediate frequency to the first functional block while it is in an active state, or to supply a clock signal having the lowest frequency to the second functional block regardless of whether the block is in an active or idle state.

Furthermore, a preferable mode is one wherein the electronic apparatus, in the receiving operation mode, is adapted to supply a clock signal having the lowest frequency to the first functional block regardless of whether the block is in an active or idle state, or to supply a clock signal having the lowest frequency to the second functional block while it is in an idle state and to supply a clock signal having the intermediate frequency to the second functional block while it is in an active state.

BRIEF DESCRIPTION OF THE SEVERAL VIEWS OF THE DRAWINGS

The above and other objects, advantages and features of the present invention will be more apparent from the following description taken in conjunction with the accompanying drawings in which.

DETAILED DESCRIPTION OF THE INVENTION

Best modes of carrying out the present invention will be described in further detail using various embodiments with reference to the accompanying drawings.

FIRST EMBODIMENT

In operation of this embodiment, control is given so that a frequency to be supplied to a functional block in an idle state where any operation is not required is lower than that to be supplied to a functional block being in an active state.

Figure 1:
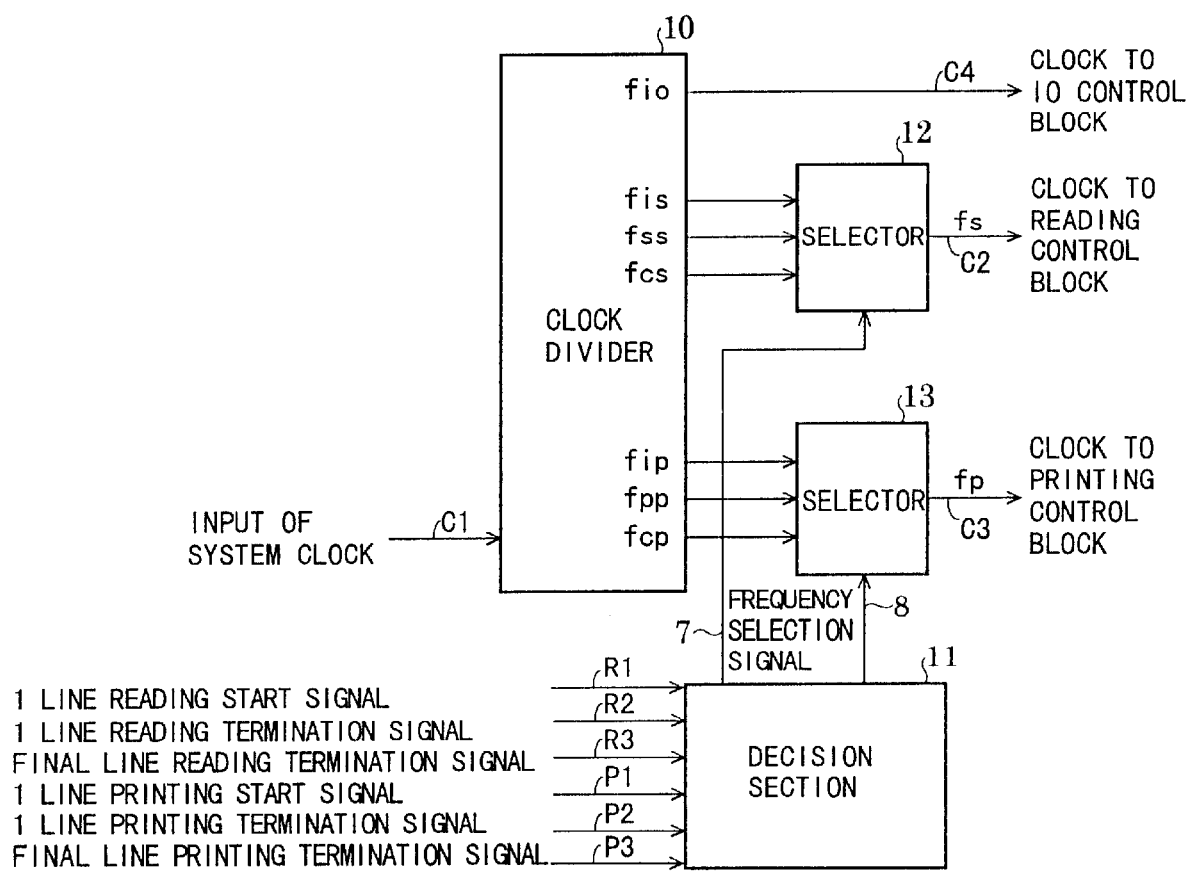
FIG. 1 shows a block diagram illustrating a clock supply circuit according to a first embodiment of the present invention.

FIG. 1 is a block diagram illustrating a clock supply circuit of the first embodiment.

The clock circuit 1 of the present invention is built into custom ICs of, for example, a facsimile where an operation clock is generated for the ICs. The clock supply circuit 1 is provided with a clock divider 10, a decision section 11 constituting a control section and selectors 12 and 13. Prior to description of this circuit 1, a brief description of the custom IC used for the facsimile is given.

Figure 2:
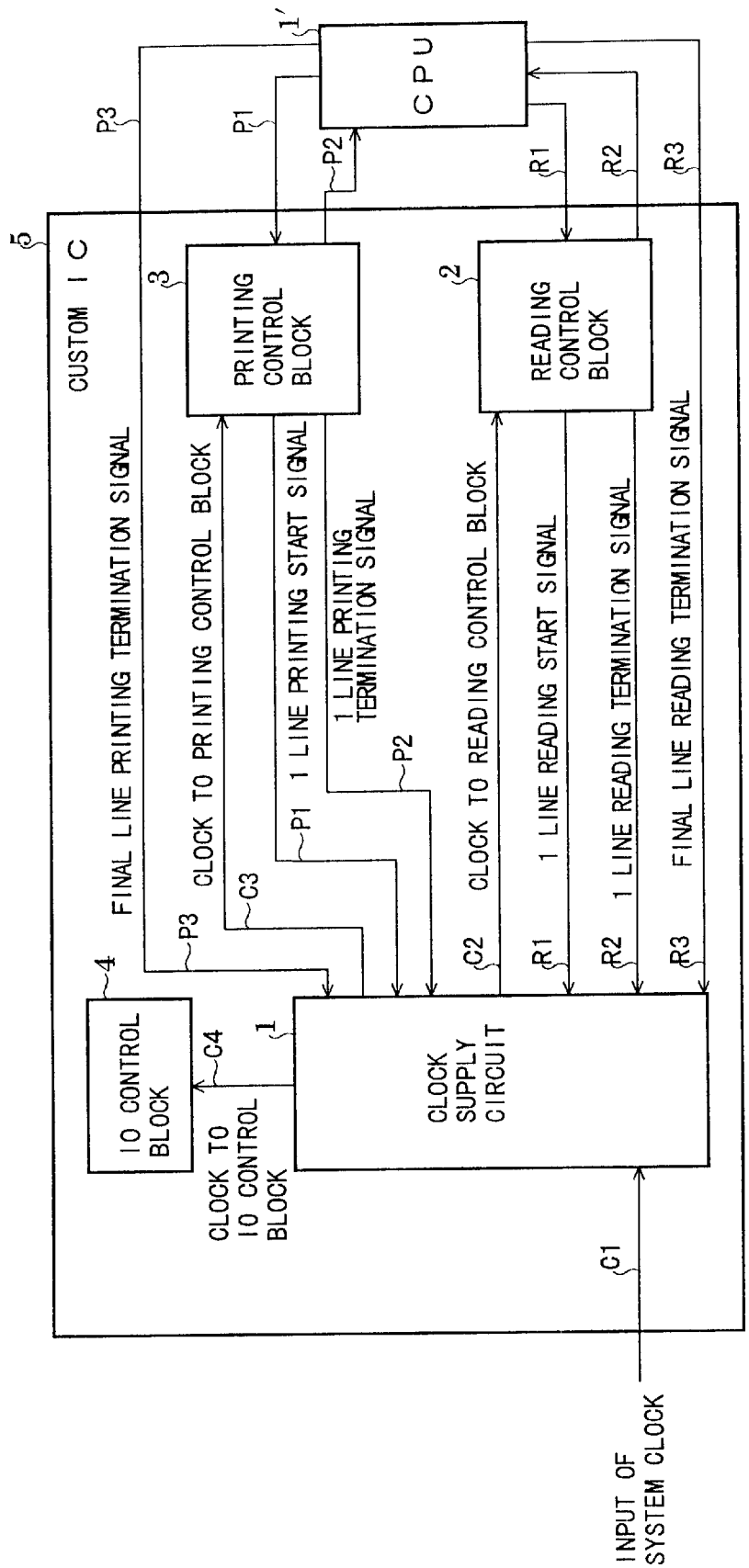
FIG. 2 is a block diagram showing a custom IC for a facsimile.

FIG. 2 is a block diagram showing a custom IC for a facsimile.

In the illustrated example for this embodiment, the custom IC 5 is composed of the above clock supply circuit 1, a reading control block 2, a printing control block 3 and an IO control block 4. The reading control block 2 is adapted to control each operation of a reading sensor (not shown) to read a facsimile manuscript and of a manuscript driving motor (not shown) and to perform processing of data read from the sensor. The printing control block 3 is used to control a printing head fitted to a printing section of the facsimile and operations of a motor for driving a printing head and to perform processing of data for printing. The IO control block 4 is adapted to control operations of a peripheral IO device and memory. The clock supply circuit 1 is so configured that it feeds a clock C2, C3 and C4 to the reading control block 2, printing control block 3 and IO control block 4.

The CPU 1' of the facsimile feeds a 1 line reading start signal R1 described later to the reading control block 2. Also, this 1 line reading start signal R1 is fed through the reading control block 2 to the clock supply circuit 1. Moreover, the CPU 1' feeds the 1 line printing start signal P1 to the printing control block 3. The printing start signal P1 is fed through the printing control block 3 to the clock supply circuit 1.

The reading control block 2 feeds the 1 line reading termination signal to the CPU 1' and the clock supply circuit 1, while the printing control block 3 feeds the 1 line printing termination signal to the CPU 1' and the clock supply circuit 1.

Referring to FIG. 1 again, a clock dividing section 10 composed of the clock divider is adapted to divide the system clock C1 supplied from a clock generating circuit (not shown) fitted to the facsimile into plural clocks each having a different frequency (fio, fis, fss, fcs, fip, fpp and fcp) required within the custom IC. The decision section 11 consisting of a logic circuit which monitors the 1 line reading start signal R1 and 1 line reading termination signal R2 fed from the reading control block 2 and the 1 line printing start signal P1 and 1 line printing termination signal P2 from the printing control block 3 and which generates frequency selection signals 7 and 8 on the basis of the above signals. The above-described 1 line reading start signal R1 and 1 line printing start signal P1 are control signals fed from the CPU 1' to each of the reading control block 2 and the printing control block 3 to control operations of them, and the decision section 11 receives these start signals R1 and P1 through each block. The decision section 11 is able to receive the signals R1 and P1, not through the blocks 2 and 3 but directly from the CPU 1'. The selectors 12 is used to select a frequency of a clock signal C2 to be fed to the reading control block 2 based on the frequency selection signal 7. The selector 13, which serves as a switching device, is used to select a frequency of a clock signal C3 to be fed to the printing control block 3 based on the frequency selection signal 8. A decision section 11 and selectors 12 and 13 constitute the control section (11, 12 and 13) to control supplies of clock signals to be fed from the clock divider 10 to each of the functional blocks 2, 3 and 4 described above.

Figure 3:
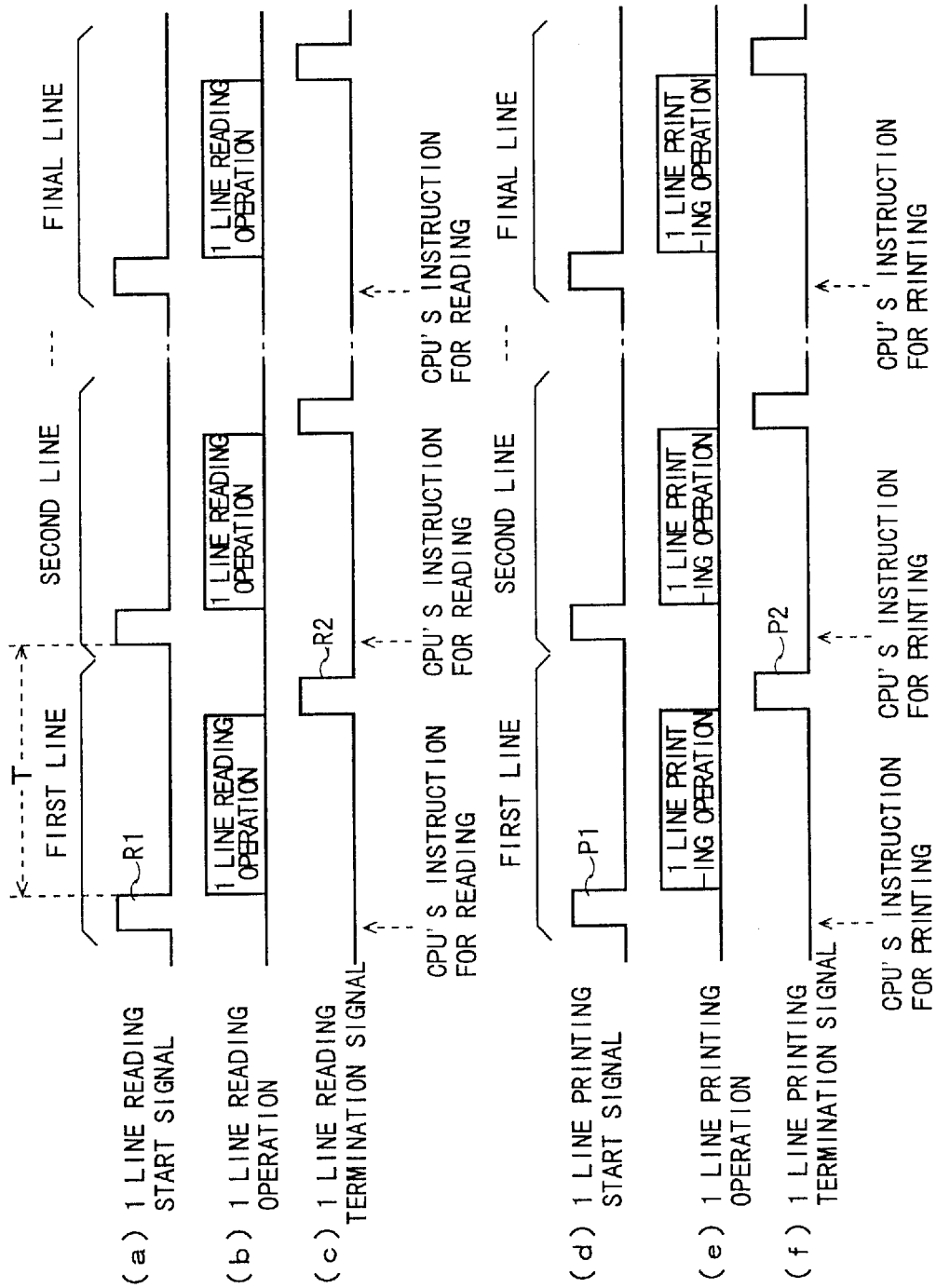
FIG. 3 is a timing chart of signals to be inputted to the decision section 11.

FIG. 3 is a timing chart of signals to be inputted to the decision section 11.

In FIG. 3, each horizontal axis represents a time base where reading and printing operations are performed at a time of T in a predetermined cycle. Timing charts shown hereafter are of the same type as this.

The 1 line reading start signal R1 and 1 line reading termination signal R2 from the reading control block 2 and the 1 line printing start signal P1 and 1 line printing termination signal P2 from the printing control block 3 are individually fed to the decision section 11 of the clock supply circuit as shown in FIG. 1. As depicted in FIG. 3(a), the 1 line reading start signal outputted from the reading control block 2 is a signal to be outputted prior to reading operations shown in (b) when the CPU (not shown) writes it on the 1 line reading start register (not shown) fitted to the reading control block 2. The 1 line reading termination signal R2 shown in FIG. 3(c) is a signal to be outputted at the time when reading of one line is complete.

As depicted in FIG. 3(d), the 1 line printing start signal P1 outputted from the printing control block 3 is a signal to be outputted prior to printing operations shown in (e) when the CPU 1' described above writes this printing start signal P1 on 1 line printing start register (not shown) fitted to the printing control block 3. The 1 line printing termination signal P2 shown in FIG. 3(f) is a signal to be outputted at the time when printing of one line is complete. Operations of the clock supply circuit 1 are described.

Figure 4:
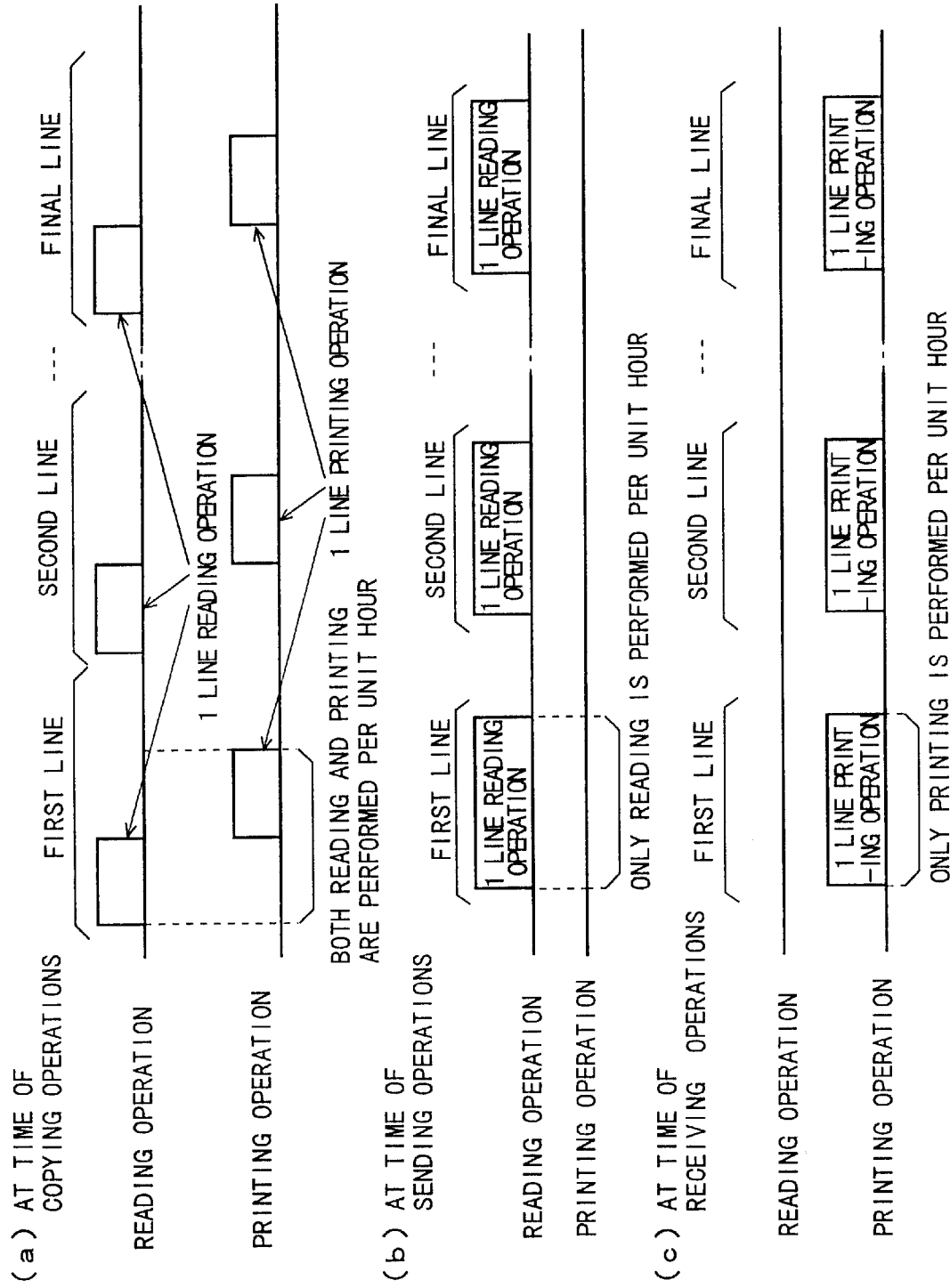
FIG. 4 is a conceptual diagram of operations in each operational state of a facsimile.

FIG. 4 is a conceptual diagram of operations in each operational state of the facsimile. FIG. 4 is described in the same manner as in FIG. 3.

The operation modes of the facsimile fall roughly into 3 modes including a sending operation mode, a receiving operation mode and a copying operation mode. In an idle state, the custom IC shown in FIG. 2, except part of the IO control block, does not operate. This state is not described in the drawing. At the time of copying operations shown in FIG. 4(a), the IO control block 4, reading control block 2 and printing control block 3 are operated. At the time of sending operations shown in FIG. 4(b), the IO control block 4 and the reading control block 2 are operated and the printing control block 3 is not operated. At the time of receiving operations shown in FIG. 4(c), the IO control block 4 and the printing control block 3 are operated and the reading control block 2 is not operated.

As described above, since operations of both reading and printing must be performed within a unit time, by speeding up a clock to actuate each of the control blocks, the operations must be speeded up. On the other hand, since all that has to be performed at the time of sending operations is a reading operation, the time to be assigned to reading operations is permitted to be longer compared with that required for copying operations. Accordingly, a clock to actuate each of the control blocks 2 and 4 at the time of sending operations is allowed to be lower-speed compared with that required for copying operations. Due to the same reasons as above, because the time to be assigned to printing operations at the time of receiving operations is permitted to be longer, a clock to actuate each of the control blocks 3 and 4 is permitted to be lower-speed than that required for copying operations. Since reading and printing operations are not required in an idle state, a clock is permitted to be further lower-speed.

According to the clock supply circuit of the present invention, a clock frequency to be supplied to each of the control blocks 2, 3 and 4 within the custom IC 5 is changed depending on each operation corresponding to each operation mode of the facsimile. This allows unnecessary power consumption in each block in a non-operation state at idle to be reduced and a noise from each block to be controlled. To achieve this, it is necessary to decide in what kinds of operational states the facsimile is. The method for the decision is described below.

Figure 5:
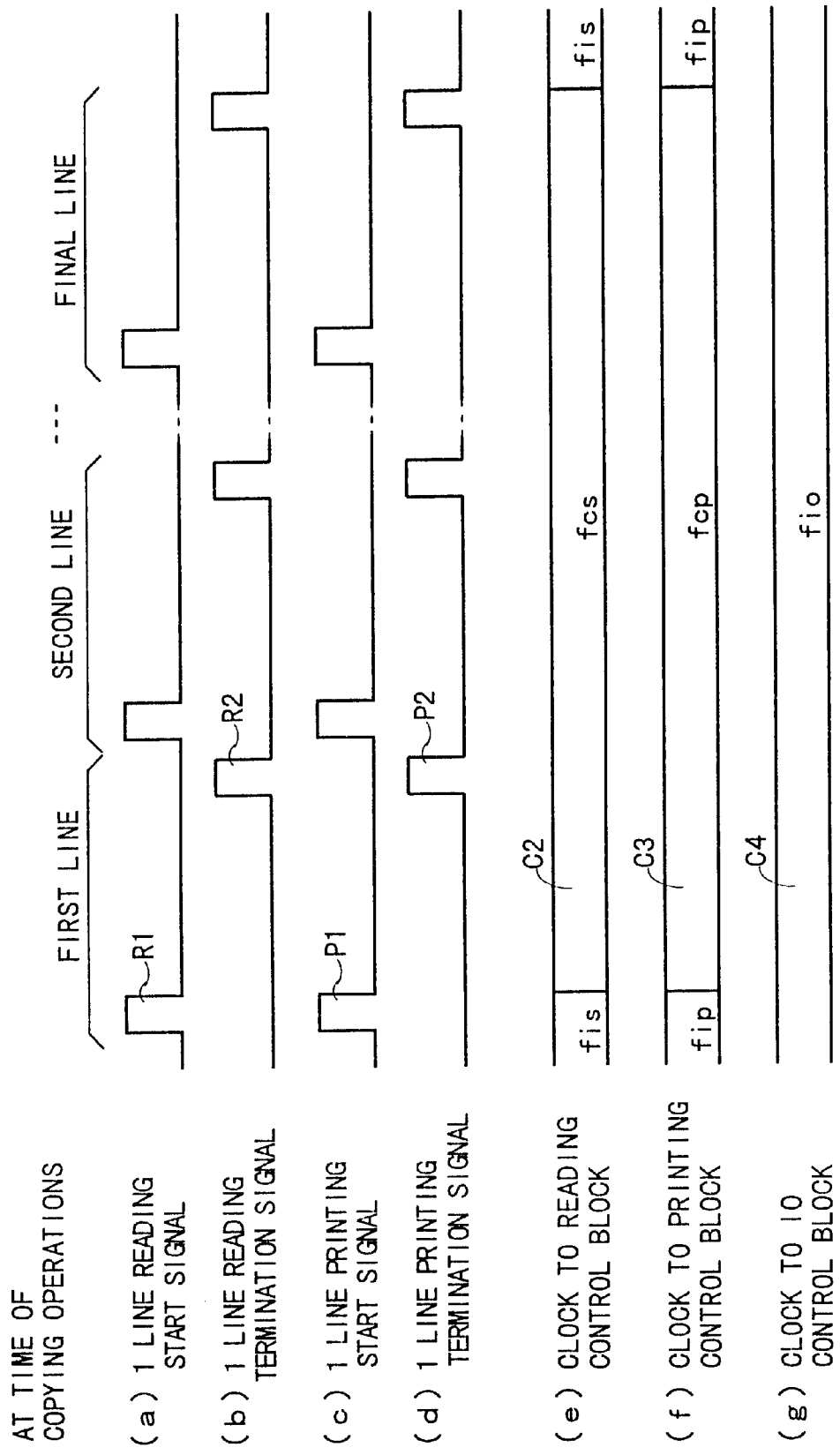
FIG. 5 shows a timing chart for operations in a copy mode of a clock supply circuit of the first embodiment.

FIG. 5 shows a timing chart for operations in a copy mode of the facsimile incorporating the clock supply circuit of the first embodiment.

Figure 6:
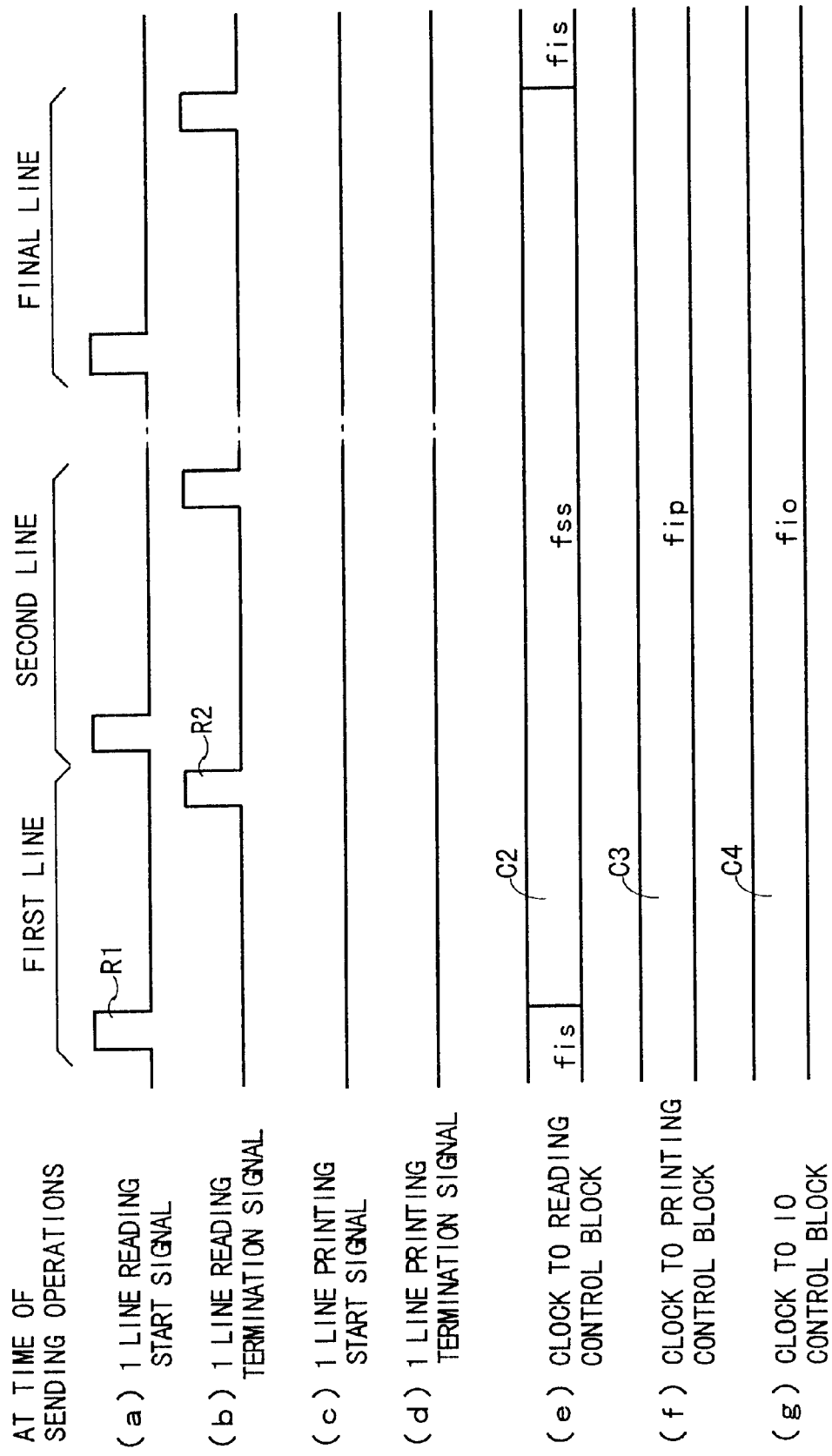
FIG. 6 shows a timing chart for operations in a sending mode of a clock supply circuit of the first embodiment.

FIG. 6 shows a timing chart for operations in a sending mode of incorporating the clock supply circuit of the first embodiment.

Figure 7:
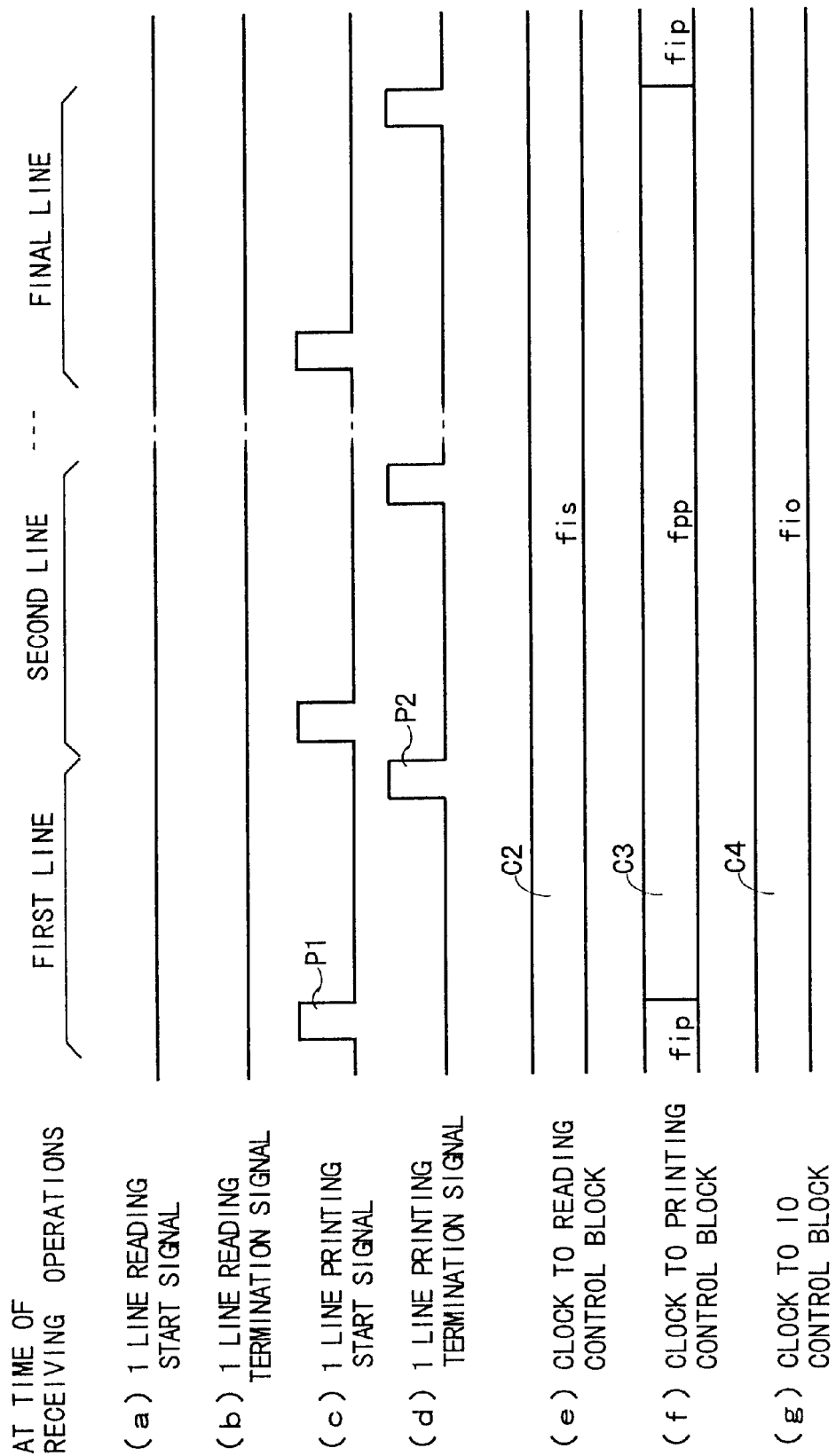
FIG. 7 shows a timing chart for operations in a receiving mode of a clock supply circuit of the first embodiment.

FIG. 7 shows a timing chart for operations in a receiving mode of incorporating the clock supply circuit of the first embodiment.

In these drawings, a frequency of a clock C2 to be supplied to the reading control block 2 is referred to as $f_s$, that of a clock C3 to be supplied to the printing control block 3 as $f_p$, that of a clock C2 to be set to the reading control block 2 in an idle state as $f_{is}$, that of a clock C2 to be set to the reading control block 2 at the time of reading operations as $f_{ss}$, that of a clock C2 to be set to the reading control block 2 at the time of copying operations as $f_{cs}$, that of a clock C3 as to be set to the printing control block 3 in an idle state as $f_{ip}$, that of a clock C3 to be set to the printing control block 3 at the time of printing operations as $f_{pp}$, and that of a dock C3 to be set to the printing control block 3 at the time of copying operations as $f_{cp}$. There is a relation among frequencies of each clock that $f_{is} < f_{ss} < f_{cs}$, $f_{ip} < f_{pp} < f_{cp}$.

The circuit of the IO control block 4 is operated at the desired clock frequency of $f_{io}$, regardless of an operation state thereof.

Referring to FIG. 5, at the time of copying operations, the CPU 1' provides instructions for a start of reading and printing. When these instructions are provided by the CPU 1', the 1 line reading start signal R1 is fed through the reading control block 2 to the clock supply circuit 1 while the 1 line printing start signal P1 is fed through the printing control block 3 to the clock supply circuit as well. When the decision section 11 of the clock supply circuit 1 detects the 1 line reading start signal R1 and the 1 line printing start signal P1, the decision section 11 sends out frequency selection signals 7 and 8 to the selectors 12 and 13 so that the frequencies $f_s$ and $f_p$ of the clock C2 and C3 to be fed by the selectors 12 and 13 are of the highest frequencies of $f_{cs}$ and $f_{cp}$ respectively. Each of the selectors 12 and 13, when receiving the frequency selection signals 7 and 8, selects the frequencies of clocks to be outputted to each of the control blocks 2 and 3 in such a manner that the frequency $f_s = f_{cs}$ and the frequency $f_p = f_{cp}$ respectively. When the CPU 1' confirms the completion of one page copying based on the 1 line reading termination signal R2 and the 1 line printing termination signal P2, it feeds a final line reading termination signal R3 and a final line printing termination signal P3 to the decision section 11.

When the decision section 11 detects each of the final line termination signals R3 and P3, the frequency selection signals 7 and 8 to be fed by the decision section 11 to the selectors 12 and 13 are switched to have the selectors 7 and 8 operate so that the frequency $f_s = f_{is}$ and the frequency $f_p = f_{ip}$, and further the selectors 12 and 13 are so operated that the frequencies of the clocks C2 and C3 to be fed to each of the control blocks are of the lowest frequencies ($f_{is}$ and $f_{ip}$).

Referring to FIG. 6, at the time of sending operations, when the CPU 1' instructs the control block 2 to start the reading, the 1 line reading start signal R1 is outputted through the reading control block to the decision section 11. When the decision section 11 detects only the line reading start signal R1, the selectors 12 and 13, based on frequency selection signals 7 and 8 from the decision section 11 as described above, select the clock frequency so that the frequency $f_s=f_{ss}$ and $f_p=f_{ip}$ respectively. When the CPU 1' confirms the completion of the reading of one page, based on the 1 line reading termination signal R2, the final line termination signal R3 is fed by the CPU 1' to the decision section 11. When the decision section 11 detects the final line termination signal R3, based on frequency selection signals 7 and 8 to be fed from the decision section 11, the selectors 12 and 13 select a clock of low frequency so that the frequency $f_s=f_{is}$ and $f_{p=fip}$.

Referring to FIG. 7, at the time of receiving operations, the CPU 1' instructs the printing control block 3 to start printing, the 1 line printing start signal P1 is outputted through the printing control block 3 to the decision section 11. When the decision section 11 detects the 1 line printing start signal only, the decision section 11 switches frequency selection signals 7 and 8 to be fed respectively to the selectors 12 and 13 so that the frequency $f_{s=fis}$ and $f_p=f_{pp}$. The selectors 12 and 13 select a clock frequency, based on these frequency selection signals 7 and 8, so that the frequency $f_s=f_{is}$ and $f_p=f_{pp}$. After the reading of one line is complete, when the decision section 11 detects the 1 line printing termination signal P2 showing the detection of the final line fed from the printing control block 3, based on frequency selection signals 7 and 8, the selectors 12 and 13 select clocks of low frequencies so that the frequency $f_s=f_{is}$ and $f_p=f_{ip}$.

Thus, according to the first embodiment of the present invention, because a clock having a frequency being well matched to operational states of the facsimile is supplied to the reading control block 2, printing control block 3 and other control block within the custom IC 5 and because a clock frequency to be fed to functional blocks in an idle state requiring no operations is reduced, power consumption of the whole custom IC can be more reduced compared with a conventional configuration wherein a clock of fixed frequency is constantly supplied to each functional block regardless of operational states at the time of power-in and a noise produced by the custom IC due to supplies of clocks of high frequencies can be controlled.

SECOND EMBODIMENT

In operations of the first embodiment, the decision section 11 constituting the control section detects a final line, based on a termination signal representing the termination of processing of one line to be fed by the reading control block 2 and printing block 3 shown in FIG. 1 and, according to the detection result, selects a clock frequency to be supplied to the reading control block 2 and printing control block 3. According to the second embodiment, the notice signal of termination is not required. In the operation of the second embodiment, a clock supply circuit automatically detects the termination of an operation of each of the functional blocks. This allows control of operations without imposing load on the CPU 1'.

Figure 8:
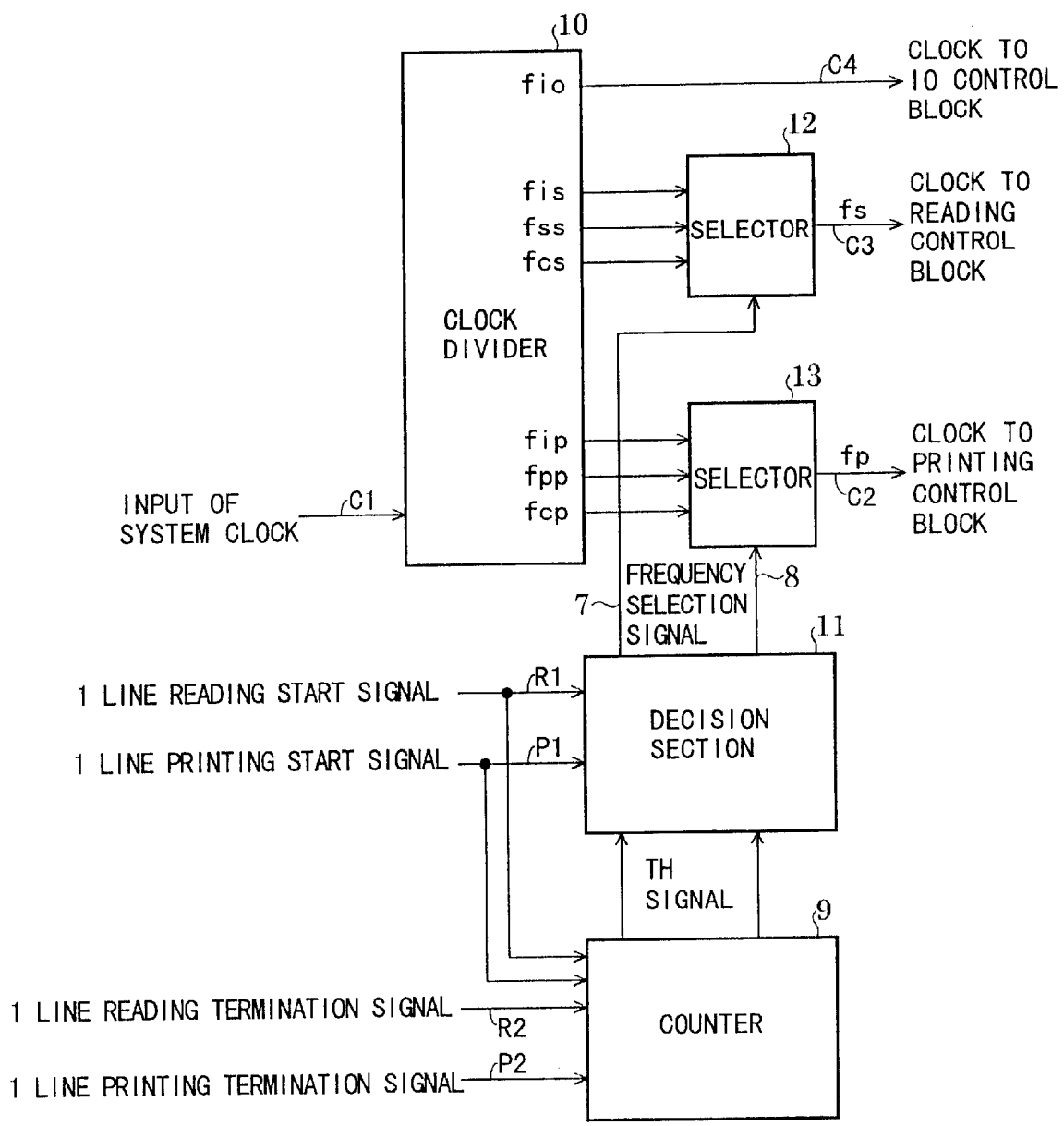
FIG. 8 is a block diagram illustrating a clock supply circuit of a second embodiment.

FIG. 8 is a block diagram illustrating a clock supply circuit of a second embodiment.

A clock divider 10, and selectors 12 and 13 shown in FIG. 8 are the same as those in FIG. 1. As depicted in FIG. 8, a counter 9 is additionally provided to a control section of a clock supply circuit. The counter 9 receives a 1 line reading start signal R1, 1 line printing start signal P1, 1 line reading termination signal R2 and 1 line printing termination signal P2. The counter 9, when receiving the 1 line reading termination signal R2, starts and continues counting until it receives the 1 line reading start signal R1, and if the counter's value exceeds a predetermined threshold value, i.e., the counter's value reaches its terminal one, outputs a TH signal to the decision section 11. Moreover, the counter 9, when receiving the 1 line printing termination signal P2, starts and continues counting until it receives the 1 line printing start signal P1, and if the counter's value exceeds a predetermined threshold value, i.e., the counter's value reaches its terminal one, outputs a TH signal to the decision section 11. The decision section 11 receives the 1 line reading start signal R1 and 1 line printing start signal P1 showing a start of processing from each of the functional blocks 2 and 3. The decision section 11 receives the TH signal from the counter 9. The decision section 11 creates frequency selection signals 7 and 8 based on contents of a signal received.

When the counter 9, as described above, detects the 1 line reading termination signal R2 or the 1 line printing termination signal P2 showing the completion of processing of one line, it starts counting and, when the counter's value reaches its terminal value, it outputs TH signals. The counter 9, when receiving the 1 line reading start signal R1 or 1 line printing start signal P1 showing a start of processing from each of the functional blocks 2 and 3 in the course of counting, clears its counted value and operates to stop counting.

Processing at the time of an end of operations in the second embodiment is different from that in the first embodiment. An example of processing performed at the end of a sending mode is described below.

Figure 9:
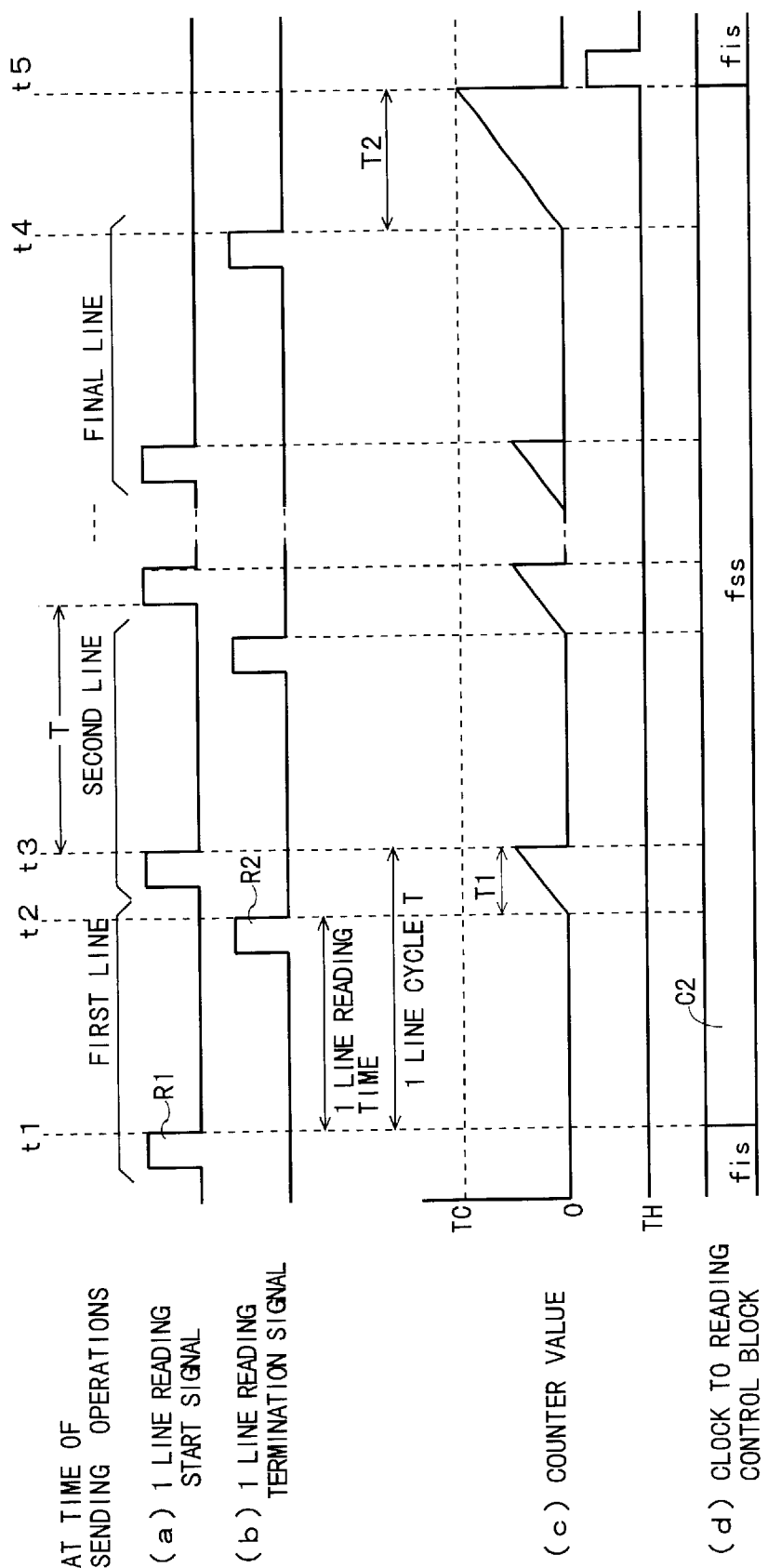
FIG. 9 shows a timing chart for operations in a sending mode of a clock supply circuit of a second embodiment.

FIG. 9 shows a timing chart for operations in a sending mode of a facsimile incorporating a clock supply circuit 1 of a second embodiment.

Contents of the 1 line reading start signal R1 and 1 line printing start signal P1 shown in FIG. 9 are the same as those in FIG. 6. The timing configuration is such that a terminally-counted value (i.e., period T2) is larger than values counted (i.e., period T1) after the receipt of the 1 line reading termination signal P2 until the receipt of the subsequent 1 line reading start signal P1. When the CPU 1' provides an instruction for a start of reading, a 1 line reading start signal is outputted through the reading control block 2 to the counter 9. Referring to FIG. 9, when the 1 line reading start signal only is detected at a time t1, the selectors 12 and 13 select the clock frequency so that $f_s=f_{ss}$ and $f_p=f_{ip}$. The counter 9, when detecting the 1 line reading termination signal R2 at a time t2, starts counting.

If a line to be read is not a final line, at a time t3 before the value of the counter 9 reaches its terminal one, in order to read one line and to detect a reading start signal R1, the counter 9 is cleared and stops its counting. After that, at a time t4, because the line to be read is a final line, the counter 9 continues counting until its value reaches its terminal one and, at a time t5, a TH signal is outputted. When the decision section 11 detects the TH signal, the selectors 12 and 13 select the clock frequency so that $f_s=f_{is}$ and that $f_p=f_{ip}$.

Though a description of operations at the time of sending is made in the above example, the detection of operational termination is possible at the time of receiving and copying in the same manner as at the time of sending. The above counter acts as a timer and its configurations or signals used to start operations are arbitrary. All that is expected for the counter is to detect a stop for a predetermined period of time in operations of a block to be detected. Furthermore, if the stop of operations of a block to be detected is more easily detected, it is not necessary to monitor the block by the timer.

In the operations of the second embodiment, since it is not necessary to receive a notice of the termination of processing on a final line from the CPU 1' in reading operations requiring control for every line, no load is imposed on the CPU 1'. This also serves to reduce the number of signal lines used for the notice from the outside. Furthermore, the configurations of this embodiment can be applied to the operations of a third embodiment.

THIRD EMBODIMENT

In operations of the first embodiment, the selectors 12 and 13 select clocks to be fed to the blocks 2 and 3 based on frequency selection signals 7 and 8. In operations of this third embodiment, gate circuits are interposed additionally between the selectors 12 and 13 constituting a control section of a clock supply circuit 1 and the control blocks 2 and 3, each corresponding to each of the selectors and, through the use of the interruption activity of the gate circuit, the supply of clocks are adapted to be stopped. This enables reduction of power consumption caused by a supply of unnecessary clocks.

Figure 10:
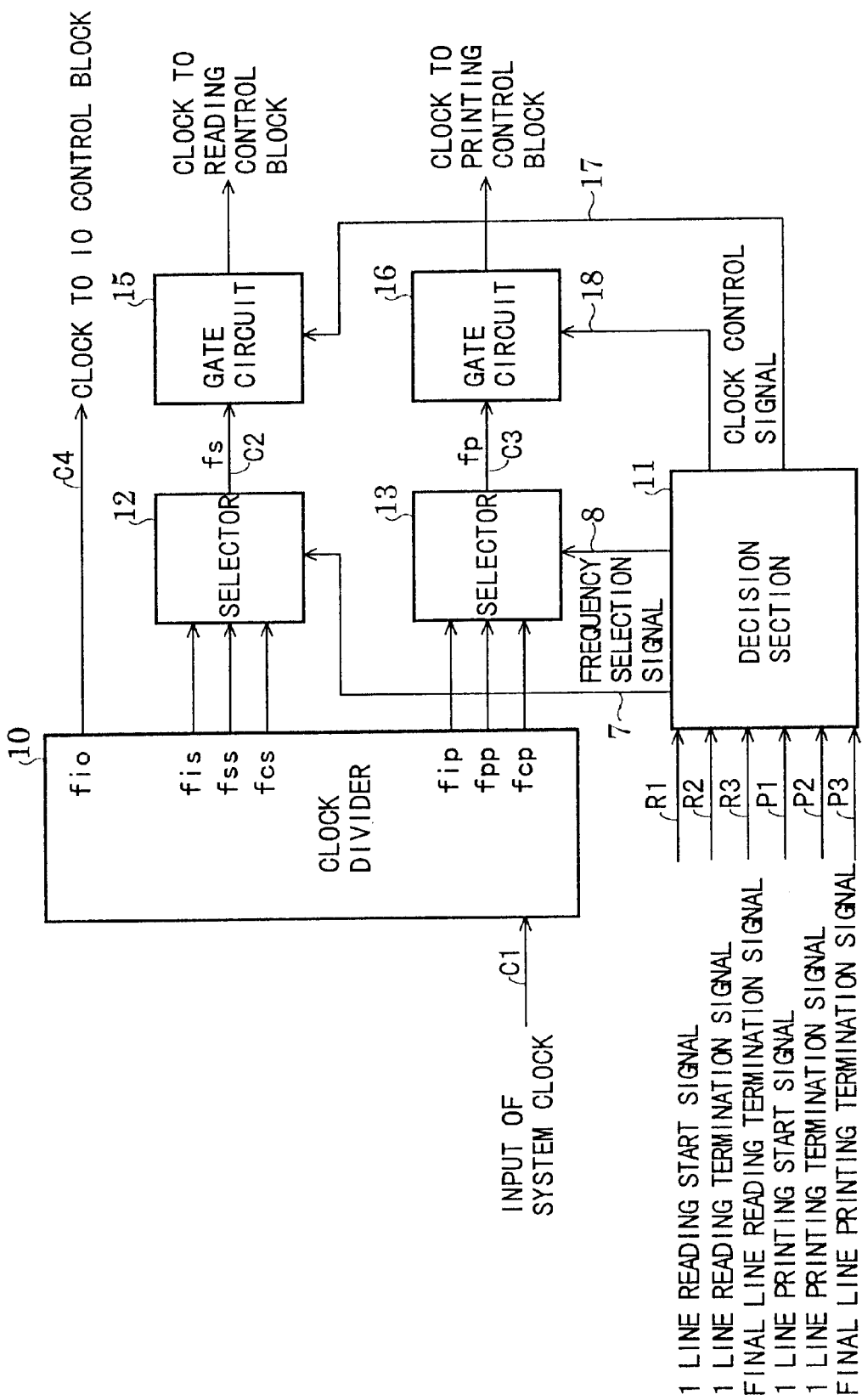
FIG. 10 is a block diagram illustrating a clock supply circuit of a third embodiment.

FIG. 10 is a block diagram illustrating a clock supply circuit of a third embodiment.

In the clock supply circuit 1 shown in FIG. 10, two gate circuits 15 and 16 are added thereto. These gate circuits 15 and 16, together with a decision section 11 and the selectors 12 and 13, constitute the control section described above.

The gate circuit 15 has a switching function to allow or not to allow a clock C2 for reading control outputted from the selector 12 to be fed to the control block 2. The gate circuit 16 has a switching function to allow or not to allow a clock C3 for printing control outputted from the selector 13 to be fed to the control block 3.

The decision section 11 feeds a clock control signal 17 to control the switching function to the gate circuit 15 and a clock control signal 18 to control the switching function to the gate circuit 16. These clock control signals 17 and 18 are adapted to control opening and closing of each of the gate circuits.

Figure 11:
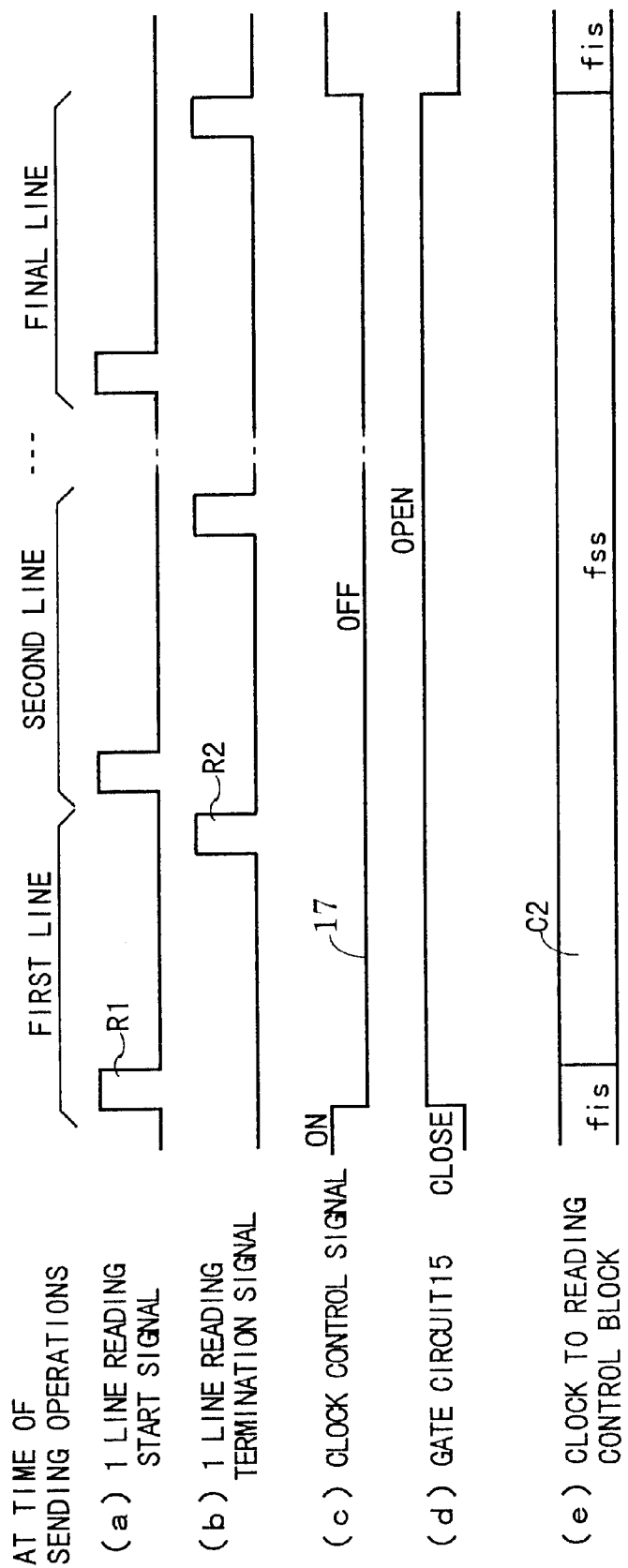
FIG. 11 shows a timing chart for operations in a sending mode of a clock supply circuit of a third embodiment.

FIG. 11 shows a timing chart for operations in a sending mode of a facsimile incorporating a clock supply circuit 1 of the third embodiment.

The contents of a 1 line reading start signal R1 and of a 1 line reading termination signal R2 shown in FIG. 11 are the same as shown in FIG. 6.

In operations of the third embodiment, when the reading control block 2 does not operate in an idle state, as the clock control signal 17 to be fed from the decision section 11 to the gate circuit 15 is maintained in the OFF state, the gate circuit 15 closes its gate, thereby stopping the supply of the clock to the reading control block 2. When the printing control block 3 does not operate in an idle state, as the clock control signal 18 to be fed from the decision section 11 to the gate circuit 16 is maintained in the OFF state, the gate circuit 16 closes its gate, thereby stopping the supply of the clock to the printing control block 3.

Furthermore, before the start of reading (i.e., in an idle state), as the decision section 11 turns off the dock control signals 17 and 18, causing the supply of clocks to the reading control block 2 and printing control block 3 to be stopped. When the CPU provides an instruction for a start of reading, the 1 line reading start signal R1 is outputted from the reading control block 2.

The decision section 11, when detecting the 1 line reading start signal R1, outputs a frequency selection signal 7 to the selector 12, causing the selector 12 to select the clock frequency so that $f_s = f_{ss}$. At the same time, the decision section 11 turns ON a clock control signal 17 for reading control to be fed to the gate circuit 15 and a clock signal having an intermediate frequency $f_{ss}$ is supplied to the reading control block 2. After the reading of one line is complete, the decision section 11, when detecting a final line reading termination signal R3, turns OFF the clock control signal, causing a supply of a clock to the reading control block 2 to be stopped. Operations in other modes are the same as described with reference to FIG. 6.

At the time of operations in the receiving mode, as described above, operations are so controlled, by the ON/OFF of the clock control signal 18 to be fed to the gate circuit 16, that the clock C3 of an intermediate frequency $f_{pp}$ is outputted only when the printing control block 3 is operating. Operations are performed in the same manner as at the time of operations in the sending mode and the illustration thereof is omitted accordingly.

Though, in the above embodiments, descriptions of operations are made taking a custom IC built in a facsimile, the present invention is able to be applied to a variety of clock supply circuits as well.

By stopping a supply of a clock to a functional block in an idle state where any operation is not needed, full stop of operations of the whole block is made possible, thus, reducing more power consumption in the custom ICs compared with the case in the first embodiment and, as a result, a noise emitted from the custom IC is controlled accordingly.

As described above, according to the present invention, by monitoring operations of the functional blocks receiving clock signals from the clock dividing section and by controlling a supply of clock signals to be fed to the functional blocks from the clock dividing section depending on an active state of the functional block where a desired operation is required or on an idle state where no operation is required, unnecessary power consumption is reduced and the noise problem caused by unnecessary operations of a high-frequency wave is solved.

It is thus apparent that the present invention is not limited to the above embodiments but may be changed and modified without departing from the scope and spirit of the invention.

What is claimed is:

1. A clock supply circuit for feeding a clock signal to a functional block of an electronic apparatus having a functional block being operating based on a clock signal produced by dividing a system clock comprising:

a clock dividing section for generating said clock signal to be fed to said functional block by dividing said system clock; and a control section for controlling a supply of said clock signal from said clock dividing section to said functional block depending on an active state of said functional block where a desired operation is required or on an idle state where no operation is required wherein said clock dividing section is adapted to generate a plurality of clock signals each having a different frequency and wherein said control section comprises selectors adapted to selectively output said plural clock signals fed by said clock dividing section, and a decision section adapted to control a selection operation of said selectors so that, in an active state of said functional block where said desired operation is required, a clock signal selected out of said plural clock signals having proper frequency is supplied to ensure adequate operations of said functional block and so that, in an idle state, a clock signal having a frequency being lower than that of said clock supplied in said state where said desired operation is required is fed to said functional block and wherein said electronic apparatus is equipped with a plurality of functional blocks and wherein said clock dividing section is adapted to generate a plurality of clock signals each having a different frequency and wherein each functional block is provided with one of the selectors for providing the selected frequency to the functional block.

2. The clock supply circuit according to claim 1, wherein said control section is provided with a counter used for detecting the termination of said desired operation of said each functional block and the frequency of a clock signal to be fed to said each functional block the termination of said desired operation of which is detected by said counter is made lower by said decision section.

3. The clock supply circuit according to claim 1, wherein said control section is further provided with a gate circuit adapted to allow or not to allow a supply of said clock signal to said functional block and the operation of said gate circuit is so controlled by said decision section that, in an active state of said functional block where said desired operation is required, said clock signal is supplied to said functional block to ensure proper operations of said functional block and that, in an idle state, the supply of said clock signal to said functional block is stopped.

4. A clock supply circuit for feeding a clock signal to a functional block of an electronic apparatus having a functional block being operating based on a clock signal produced by dividing a system clock comprising:

a clock dividing section for generating said clock signal to be fed to said functional block by dividing said system clock; and a control section for controlling a supply of said clock signal from said clock dividing section to said functional block depending on an active state of said functional block where a desired operation is required or on an idle state where no operation is required wherein said electronic apparatus is provided with a first functional block to control reading of data and a second functional block to control printing operations, having a facsimile function and copying function and wherein said dividing section is adapted to generate a clock signal having three kinds of frequencies, i.e., lowest frequency, highest frequency and intermediate frequency to be fed to said first and second functional blocks and said clock signal to be fed to said functional block according to the active state and idle state of said each functional block is selected out of said clock signal having said lowest, highest and intermediate frequencies with reference to each of operational modes including copying, sending and receiving operation modes of said electronic apparatus.

5. The clock supply circuit according to claim 4, wherein said electronic apparatus, in the copying operation mode, is adapted to supply a clock signal having said lowest frequency to said first functional block while it is in an idle state and to supply a clock signal having said highest frequency to said first functional block while it is in an active state, or to supply a clock signal having said lowest frequency to said second functional block while it is in an idle state and to supply a clock signal having said highest frequency to said functional block while it is in an active state.

6. The clock supply circuit according to claim 4, wherein said electronic apparatus, in the sending operation mode, is adapted to supply a clock signal having said lowest frequency to said first functional block while it is in an idle state and to supply a clock signal having said intermediate frequency to said first functional block while it is in an active state, or to supply a clock signal having said lowest frequency to said second functional block regardless of whether said block is in an active or idle state.

7. The clock supply circuit according to claim 4, wherein said electronic apparatus, in the receiving operation mode, is adapted to supply a clock signal having said lowest frequency to said first functional block regardless of whether said block is in an active or idle state, or to supply a clock signal having said lowest frequency to said second functional block while it is in an idle state and to supply a clock signal having said intermediate frequency to said second functional block while it is in an active state.

8. The clock supply circuit according to claim 4, wherein said control section is provided with a counter used for detecting the termination of said desired operation of said each functional block and the frequency of a clock signal to be fed to said each functional block the termination of said desired operation of which is detected by said counter is made lower by said decision section.

9. The clock supply circuit according to claim 4, wherein said control section is further provided with a gate circuit adapted to allow or not to allow a supply of said clock signal to said functional block and the operation of said gate circuit is so controlled by said decision section that, in an active state of said functional block where said desired operation is required, said clock signal is supplied to said functional block to ensure proper operations of said functional block and that, in an idle state, the supply of said clock signal to said functional block is stopped.

10. The clock supply circuit according to claim 1, wherein said electronic apparatus, in the copying operation mode, is adapted to supply a clock signal having said lowest frequency to said first functional block while it is in an idle state and to supply a clock signal having said highest frequency to said first functional block while it is in an active state, or to supply a clock signal having said lowest frequency to said second functional block while it is in an idle state and to supply a dock signal having said highest frequency to said functional block while it is in an active state.

11. The clock supply circuit according to claim 1, wherein said electronic apparatus, in the sending operation mode, is adapted to supply a clock signal having said lowest frequency to said first functional block while it is in an idle state and to supply a clock signal having said intermediate frequency to said first functional block while it is in an active state, or to supply a clock signal having said lowest frequency to said second functional block regardless of whether said block is in an active or idle state.

12. The clock supply circuit according to claim 1, wherein said electronic apparatus, in the receiving operation mode, is adapted to supply a clock signal having said lowest frequency to said first functional block regardless of whether said block is in an active or idle state, or to supply a clock signal having said lowest frequency to said second functional block while it is in an idle state and to supply a clock signal having said intermediate frequency to said second functional block while it is in an active state.

13. A clock supply circuit for supplying clock signals to an electronic apparatus having a plurality of functional blocks, each functional block operating based on said clock signal, comprising:

a clock dividing section to receive and divide a system clock, and to output a plurality of clock signals with different frequencies;

a decision section for selecting one appropriate frequency from the plurality of clock signals to be supplied to one of the plurality of functional blocks based on an operating state signal of the one of said plurality of functional blocks and for outputting a decision signal as a frequency selection signal; and at least one selector receiving at least two clock signals outputted from said dividing section and receiving said decision signal outputted from said decision section, selecting one of the received clock signals based on the received decision signal, and outputting said selected clock signal to said electronic apparatus for supplying said selected clock signal to said one of said functional blocks.

14. The clock supply circuit according to claim 13, wherein said clock dividing section is adapted to generate a plurality of clock signals each having a different frequency and wherein said control section comprises selectors adapted to selectively output said plural clock signals fed by said clock dividing section, and a decision section adapted to control a selection operation of said selectors so that, in an active state of said functional block where said desired operation is required, a clock signal selected out of said plural clock signals having proper frequency is supplied to ensure adequate operations of said functional block and so that, in an idle state, a clock signal having a frequency being lower than that of said clock supplied in said state where said desired operation is required is fed to said functional block.

15. The clock supply circuit according to claim 14, wherein said electronic apparatus is equipped with a plurality of functional blocks and wherein said clock dividing section is adapted to generate a plurality of clock signals each having a different frequency depending on each functional block and wherein each block is provided with each selector.

16. The clock supply circuit according to claim 15, wherein said control section is provided with a counter used for detecting the termination of said desired operation of said each functional block and the frequency of a clock signal to be fed to said each functional block the termination of said desired operation of which is detected by said counter is made lower by said decision section.

17. The clock supply circuit according to claim 15, wherein said control section is further provided with a gate circuit adapted to allow or not to allow a supply of said clock signal to said functional block and the operation of said gate circuit is so controlled by said decision section that, in an active state of said functional block where said desired operation is required, said clock signal is supplied to said functional block to ensure proper operations of said functional block and that, in an idle state, the supply of said clock signal to said functional block is stopped.

18. The clock supply circuit according to claim 13, wherein said control section comprises a gate circuit adapted to allow or not to allow the supply of said clock signal outputted from said clock dividing section to said functional block and a decision circuit adapted to give control to operations of said gate circuit so that, in an active state of said functional block where said desired operation is required, said clock signal is supplied to said functional block to ensure proper operations of said functional block and that, in an idle state, the supply of said clock signal to said functional block is stopped.

19. The clock supply circuit according to claim 13, wherein said electronic apparatus is provided with a first functional block to control reading of data and a second functional block to control printing operations, having a facsimile function and copying function and wherein said dividing section is adapted to generate a clock signal having three kinds of frequencies, i.e., lowest frequency, highest frequency and intermediate frequency to be fed to said first and second functional blocks and said clock signal to be fed to said functional block according to the active state and idle state of said each functional block is selected out of said clock signal having said lowest, highest and intermediate frequencies with reference to each of operational modes including copying, sending and receiving operation modes of said electronic apparatus.

20. The clock supply circuit according to claim 19, wherein said electronic apparatus, in the copying operation mode, is adapted to supply a clock signal having said lowest frequency to said first functional block while it is in an idle state and to supply a clock signal having said highest frequency to said first functional block while it is in an active state, or to supply a clock signal having said lowest frequency to said second functional block while it is in an idle state and to supply a dock signal having said highest frequency to said functional block while it is in an active state.

21. The clock supply circuit according to claim 19, wherein said electronic apparatus, in the sending operation mode, is adapted to supply a clock signal having said lowest frequency to said first functional block while it is in an idle state and to supply a clock signal having said intermediate frequency to said first functional block while it is in an active state, or to supply a clock signal having said lowest frequency to said second functional block regardless of whether said block is in an active or idle state.

22. The clock supply circuit according to claim 19, wherein said electronic apparatus, in the receiving operation mode, is adapted to supply a clock signal having said lowest frequency to said first functional block regardless of whether said block is in an active or idle state, or to supply a clock signal having said lowest frequency to said second functional block while it is in an idle state and to supply a clock signal having said intermediate frequency to said second functional block while it is in an active state.

23. The clock supply circuit according to claim 13, wherein said operating state signal is output signal from said functional block.

24. The clock supply circuit according to claim 13, wherein when a plural number of said functional blocks are operating, said decision section decides a higher said frequency with respect to each operating functional block and when only one said functional block is operating, said decision section decides a lower said frequency with respect to the operating functional block.

* * * * *